(12) United States Patent
Pollak et al.

(10) Patent No.: US 6,938,671 B2
(45) Date of Patent: Sep. 6, 2005

(54) MULTIPLE-SLIDE DIE-CASTING SYSTEM

(75) Inventors: Alexandre A. Pollak, Laval (CA); Carl Thibault, Varennes (CA); Alain Bourbonnais, Montreal (CA); Richard Laveau, Montreal (CA)

(73) Assignee: Techmire Ltd., Ville d'Anjou (CA)

( * ) Notice: Subject to any disclaimer, the term of this patent is extended or adjusted under 35 U.S.C. 154(b) by 0 days.

(21) Appl. No.: 10/886,601

(22) Filed: Jul. 9, 2004

(65) Prior Publication Data

US 2004/0244937 A1 Dec. 9, 2004

Related U.S. Application Data

(62) Division of application No. 10/092,567, filed on Mar. 8, 2002, now Pat. No. 6,793,002.

(51) Int. Cl.[7] .............................................. B22D 33/04
(52) U.S. Cl. ...................................................... 164/137
(58) Field of Search ................................ 164/341, 339, 164/312, 316, 137, 113; 425/574, 575, 589, 595, 451.9, 330

(56) References Cited

U.S. PATENT DOCUMENTS

| | | | |
|---|---|---|---|
| 3,540,524 A | | 11/1970 | Bachelier |
| 4,261,414 A | | 4/1981 | Frenette et al. |
| 4,601,323 A | | 7/1986 | Doucet et al. |
| 4,660,620 A | | 4/1987 | Ozeki |
| 5,350,289 A | * | 9/1994 | Martin ........................ 425/190 |
| 5,988,260 A | | 11/1999 | Iwamoto et al. |
| 6,334,479 B1 | * | 1/2002 | Pollak et al. ................ 165/457 |
| 6,422,297 B2 | * | 7/2002 | Salata ........................ 164/312 |
| 6,564,855 B2 | | 5/2003 | Salata |
| 6,609,554 B2 | | 8/2003 | Pollak et al. |
| 6,793,002 B2 | * | 9/2004 | Pollak et al. ................ 164/312 |
| 2001/0035276 A1 | | 11/2001 | Salata |

FOREIGN PATENT DOCUMENTS

| | | | |
|---|---|---|---|
| CA | 2308990 | | 11/2001 |
| CA | 2 308 990 A1 | * | 11/2001 ........... B22D/17/20 |
| JP | 03189119 | | 8/1991 |
| JP | 04115911 | | 4/1992 |
| JP | 08039570 | | 2/1996 |

OTHER PUBLICATIONS

*Techmire Impressions*, Fall 2001, XP–002237240, p. 2.

* cited by examiner

*Primary Examiner*—Kevin P. Kerns
(74) *Attorney, Agent, or Firm*—Ogilvy Renault LLP

(57) ABSTRACT

A multiple-slide die-casting machine is equipped with improved mechanical structure and unique injection control system to improve the quality of molded products, to achieve flash free castings of improved surface finish. The clamping assemblies are mounted on one side of a base plate of the machine for applying clamping force to the mold sections in a preloaded state. A reinforcement ring interconnects the clamping assemblies to inhibit deflection of the base plate and the brackets which support the clamping assemblies so that an accurate parting line between the contacting surfaces of mold sections is insured. The unique injection control system of the machine provides selectively closed loop and open loop injection to achieve the advantage of a closed loop control injection which provides for optimal parameters for an injection cycle to eliminate hammer effect, and the advantage of open loop which is suitable for die-casting small products requiring an injection stroke too short to be reacted on in closed loop control.

7 Claims, 15 Drawing Sheets

MULTIPLE-SLIDE DIE-CASTING SYSTEM

CROSS-REFERENCE TO RELATED APPLICATION

This application is a divisional of U.S. patent application Ser. No. 10/092,567, filed on Mar. 8, 2002 now U.S. Pat. No. 6,783,002, by the present Applicants.

FIELD OF THE INVENTION

The present invention relates to die-casting machines and in particular to a multiple-slide die-casting machine which includes a mold clamping system and an injection system.

BACKGROUND OF THE INVENTION

Multiple-slide die-casting machines are known in the prior art, and they have at least two mold sections carried by shanks that are driven towards and away from each other. Molten metal is injected into the cavity formed between the two mold sections when the two mold sections are in a molding position and restrained together in a preloaded state. An example is described in applicant's U.S. Pat. No. 4,601,323, issued on Jul. 22, 1986. A machine for injection molding or die-casting according to that patent includes a main machine base with an injection unit mounted on the rear face and a mold guideway mounted on the front face. An aperture in the main machine base and a corresponding one in the base of the guideway provide for the nozzle of the injection unit to engage molds carried in the guideway. The reciprocating of the mold sections towards and away from one another is due to the action of a toggle assembly interconnecting mold carrying shanks with compression lever brackets mounted in the ends of the guideway, actuators located centrally of guideway ends and linked to the toggle assembly. Position adjusters are used for adjusting the location of the injection unit on the rear of the machine to position its nozzle relative to the molds.

It is important that the contact surfaces of the mold sections do not move, because they constitute the reference plane of the whole mold assembly. The contact plane is called the main parting line. However, in a preloaded state which is required to prevent the two mold sections from moving back while the pressurized melting metal is injected into the cavity between the mold sections, all the components of the clamping assemblies are stressed by the clamping force. The clamping force causes the table and the brackets which support the clamping assemblies to deflect because in a standard machine the said brackets are outrigged over the base. The pre-load force has to be higher than the reaction force induced by the injection pressure. Therefore, the deflection of the table and brackets caused by the clamping force is not to be ignored, and induces deformation of the mold guiding system which causes a misalignment of mold sections. Excessive wear of the slides and poor quality of molded product, such as flash formed along the parting line of the molded product, result from the base deflection and bracket deflection and mold mismatch.

There is a need for improvement of the structure of the machine to inhibit the deflection of the base in the preloaded state.

Study shows, nevertheless, the base deflection, bracket deflection and mold mismatch induced by the clamping force are not the only reason to produce the flash on the molded product. Hot chamber die-casting machines have traditionally been equipped with open loop control injection system. A key feature of the open loop control is that the pressure and flow rate of the hydraulic fluid supplied to the injection cylinder cannot be varied during the injection cycle. These parameters can be changed, but are fixed for any given injection cycle.

At the start of the cycle, hydraulic fluid fed to the injection cylinder causes the injection plunger to accelerate rapidly, then travel at approximately constant velocity to fill the cavity between the mold sections with melting metal. Once the cavity of the mold and runner system have been filled, all the moving components of the injection system come to a sudden stop. This results in a rapid increase in metal pressure within the cavity of the mold, called the "hammer effect" which often causes flash on the products. Although the degree of control over the injection process is somewhat limited with an open loop system, it is satisfactory for many applications.

For the past several years, closed loop control of the injection systems has been possible. Examples are described in U.S. Pat. No. 4,660,620, issued to Ozeki on Apr. 28, 1987, and U.S. Pat. No. 5,988,260 issued to Iwamoto et al. on Nov. 23, 1999.

Generally, the pressure and flow rate of the hydraulic fluid supplied to the injection cylinder in a closed loop control are changed during the injection cycle, and follow predetermined velocity and/or pressure profiles, and therefore the injection of the molten metal to the cavity of the mold is controlled in an optimum manner. However, the closed loop control of the injection system is currently used with large, conventional die-casting machines which have a relatively long injection time. That is because the system needs a certain minimum stroke to be able to react on and profile the injection. If a product (cast part) has to be molded which is smaller than one requiring the minimal stroke, it is typical to have to change a gooseneck of the injection system to install a smaller diameter sleeve and plunger which require a longer stroke to fill the same cavity of the mold. This is not an easy task. A small product can be produced in a very simple manner if the injection system of the machine can be switched from closed loop control to open loop control.

Therefore, there is a need for a multiple-slide die-casting machine which is adapted to change mold control mode easily from a closed loop control to an open loop control for different size products to be molded on the machine.

SUMMARY OF THE INVENTION

An object of the present invention is to provide a multiple-slide die-casting machine which is adapted to produce high quality molded products and eliminate or minimize flash on the products.

Another object of the present invention is to provide a multiple-slide die-casting machine having an improved mechanical structure to inhibit deflection of a base of the machine induced by pressure of clamping assemblies for restraining the slide mold sections together in a preloaded state.

A further object of the present invention is to provide a multiple-slide die-casting machine having a control system which is adapted to be selectable for a closed loop control or open loop control for controlling an injection system of the machine to produce molded products requiring different injection strokes.

It is yet a further object of the present invention to provide a control system for an injection system of a multiple-slide die-casting machine which has a simple structure to include both closed loop mold control and open loop mold control, and which is user-friendly to switch between the two control modes.

A still further object of the present invention is to provide a method for operating an injection system of a multiple-slide die-casting machine in selective control modes to produce molded products requiring different injection strokes to ensure the quality of the products.

According to a broad aspect of the present invention, there is provided a multiple-slide die-casting machine including a base, at least a guideway having side walls and two opposed ends mounted on the base, at least two clamping assemblies guided within the respective ends of the guideway for advancing and retracting slide mold sections towards and away from each other, and an injection system for introducing pressurized casting material into a cavity between the slide mold sections when the slide mold sections are in a molding position in which the slide mold sections are restrained together in a preloaded state, the multiple-slide die-casting machine comprising at least two brackets supported on said base for operatively securing the respective clamping assemblies and a reinforcement means for interconnecting said brackets to inhibit deflection of said base and said brackets induced by the force generated by said clamping assemblies for maintaining the preloaded state, wherein each of said clamping assemblies comprises a clamping mechanism and a shank, said shanks being slidable in one of the ends of the guideway and being connected at a first end to one of the slide mold sections and coupled at a second end to said clamping mechanism, and wherein at least one slide mold section is connected to a respective one of the shanks by a mating engagement and a clamp for quick coupling of the slide mold section with the shank.

More especially, according to a further broad aspect of the present invention, there is provided a multiple-slide die-casting machine which has a base plate and a guide member mounted on the base plate. The guide member defines two guideways crossing and perpendicular to each other, each guideway having side walls and two opposed ends. A respective clamping assembly is guided within each of the ends of each guideway for advancing and retracting a slide mold section towards and away from a centre of the guideway. An injection system is provided for introducing pressurized casting material into a cavity between the slide mold sections when the slide mold sections are in a molding position in which the slide mold sections are restrained together in a preloaded state. A respective bracket including a first surface secured to the base plate and a second surface remote from the base plate operatively secures each of the clamping assemblies between the first and second surfaces thereof. Interconnection means interconnects the second surfaces of the brackets so that the respective clamping assemblies are operatively secured between the base plate and the interconnection means, and deflection of the base plate and the brackets induced by the force generated by the clamping assemblies for maintaining the preloaded state is inhibited. Each of the clamping assemblies comprises a clamping mechanism and a shank having opposed ends, the shank being slidable between the side walls in one of the ends of one guideway, and connected at a first end thereof to one of the slide mold sections and coupled at a second end thereof to the clamping mechanism. At least one slide mold section is connected to a respective one of the shanks by a mating engagement and a clamp for quick coupling of the slide mold section with the shank.

Each of the clamping assemblies preferably comprises a clamping mechanism and a shank having opposed ends. The shank is slidable between the side walls in one of the ends of one guideway, connected at a first end thereof to one of the slide molds and coupled at a second end thereof to the clamping mechanism. The shank is coupled to the clamping mechanism through a ram and a coupling. A respective pair of stops preferably provided between each of the brackets and each of the rams to ensure the precise molding position of the slide mold sections.

Each of the couplings preferably comprises a plurality of pivotal link members adapted to transfer a translation of the clamping mechanism to a translation of the ram and shank while permitting misalignment of the translations being transferred.

Preferably, each of the clamping mechanisms is adjustably secured to a corresponding one of the brackets to ensure the pressure of the clamping assemblies for maintaining the preloaded state, as predetermined.

The multiple-slide die-casting machine incorporating the invention advantageously provides flash-free castings of improved surface finish by the use of the full clamping capacity of the clamping system and the selective use of the closed loop control and open loop control for the injection system to meet the different requirements of injection for different size products. Other features and advantages of the invention will be better understood with reference to the preferred embodiments described hereinafter.

BRIEF DESCRIPTION OF THE DRAWINGS

Having thus generally described the nature of the invention, reference will now be given to the accompanying drawings, showing by way of illustration a preferred embodiment, in which.

DETAILED DESCRIPTION OF THE PREFERRED EMBODIMENT

Figure 1:
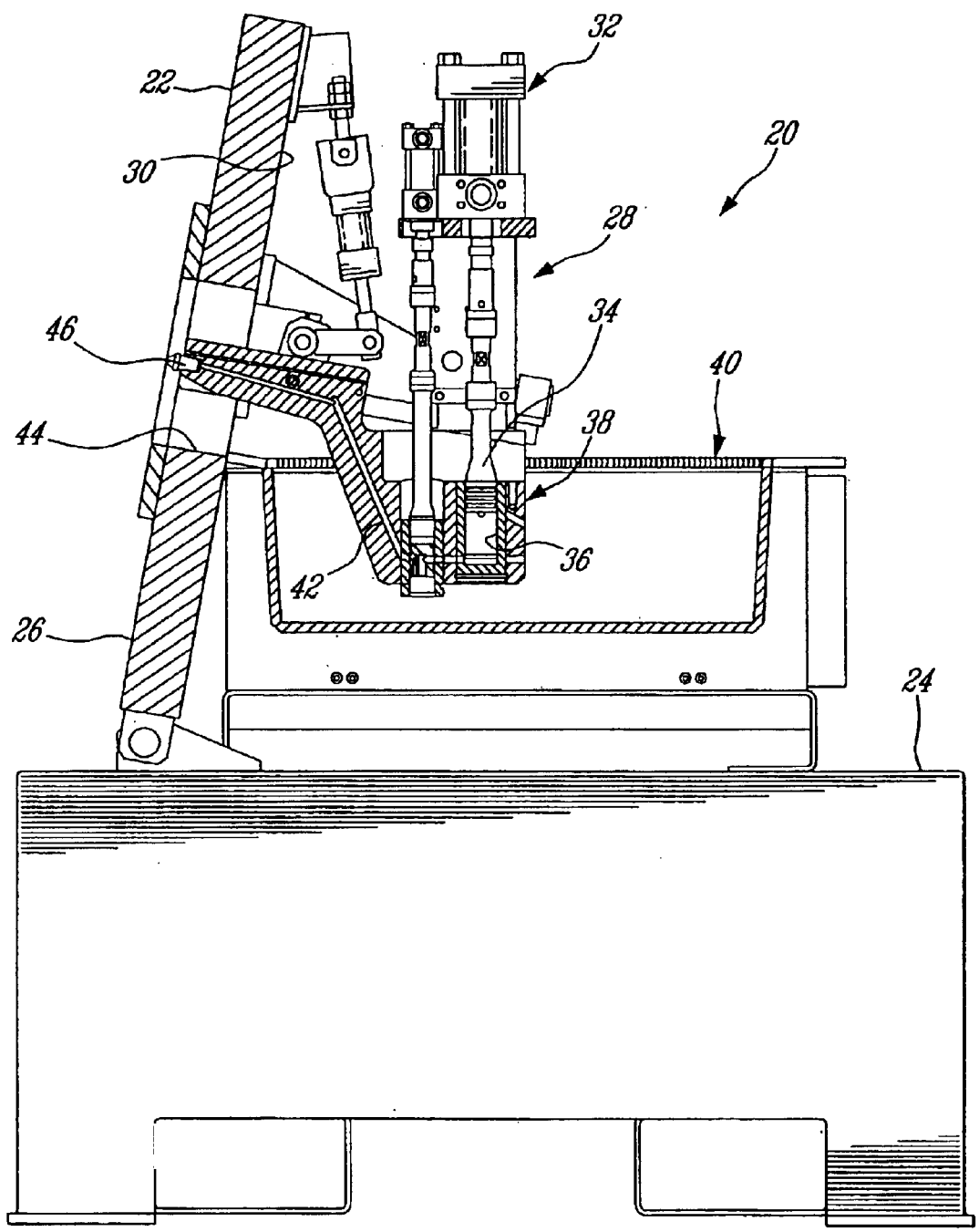
FIG. 1 is a partial cross-sectional view of a multiple-slide die-casting machine according to the present invention, with the molds clamping system removed.
Figure 2:
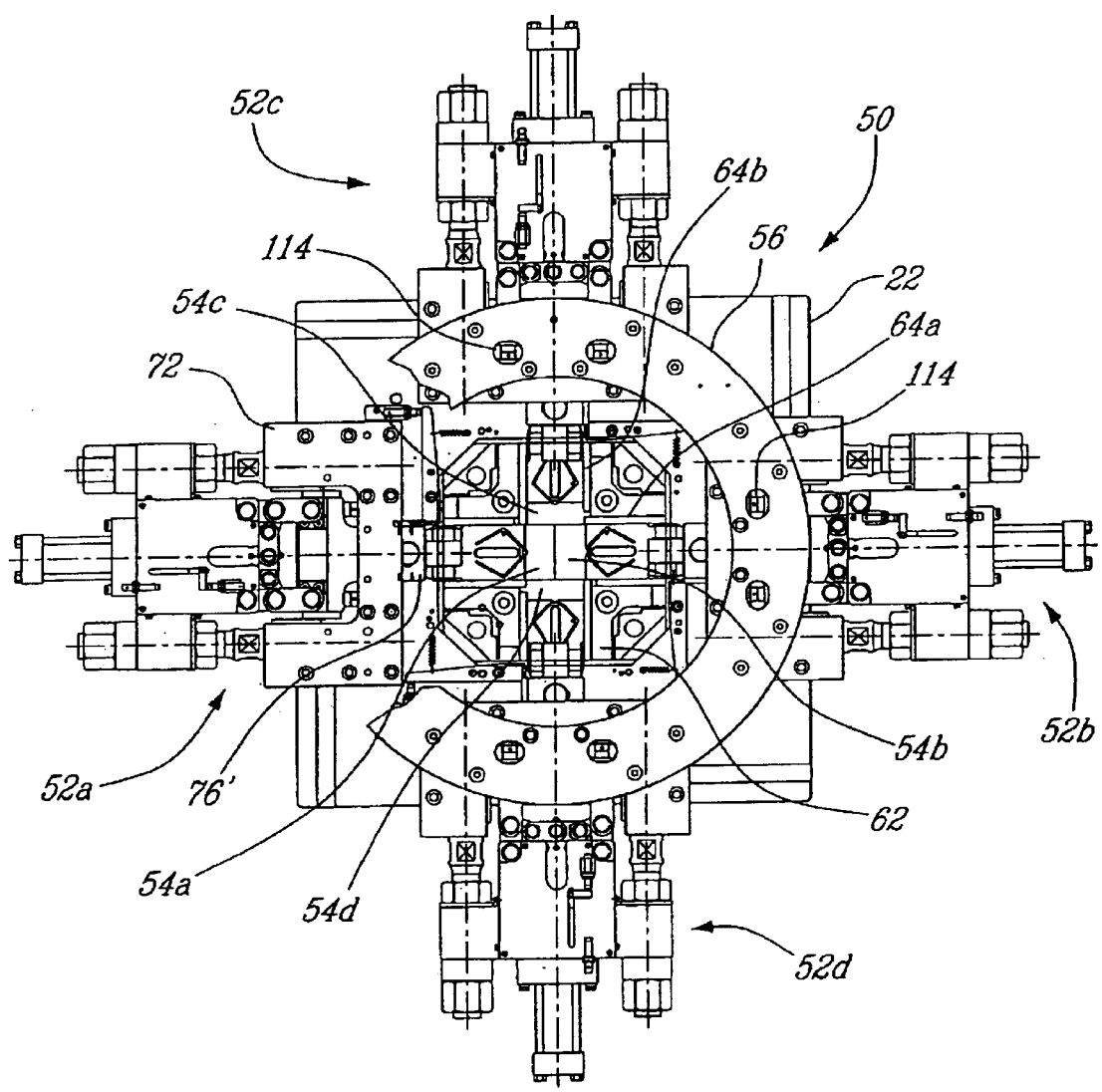
FIG. 2 is an elevational front view of a mold clamping system incorporating a preferred embodiment of the invention, adapted to be mounted on the machine in FIG. 1, and a part of the reinforcement ring being cut away, showing a bracket for operatively securing a clamping assembly to the base.

Referring now to FIG. 1, there is shown a machine, generally indicated at 20, for die-casting of products with the mold clamping system removed. The machine 20 incorporates a base plate 22 which is mounted at its lower end to a frame structure 24. The mold clamping system is to be mounted on the front side 26 of the base plate 22 and will be described hereinafter with reference to FIGS. 2 and 3. An injection system 28 is installed on the rear side 30 of the base plate 22. The injection system 28 generally includes an hydraulic cylinder 32 for advancing and retracting an injection plunger 34 to introduce molten metal into a cavity between the slidable mold sections which are shown in FIGS. 2 and 4. The injection plunger 34 is slidable in a sleeve 36 supported in a gooseneck 38 which both are adapted to be immersed in the molten metal contained in a melting pot 40. The melting pot 40 is supported on the frame structure 24. The sleeve 36 is in fluid communication with a passage 42 extending through the gooseneck 38. The gooseneck 38 extends through an opening 44 in the centre of the base plate 22. A nozzle 46 is connected to the passage 42 and is aligned with and connected to an inlet of the mold when the mold is in a molding position so that the molten metal in the sleeve 36 is forced by the injection plunger 34 through the passage 42 and the nozzle 46 into the cavity of the molds. The general structure of the injection system is well known in the art and will not be further described in detail.

Figure 3:
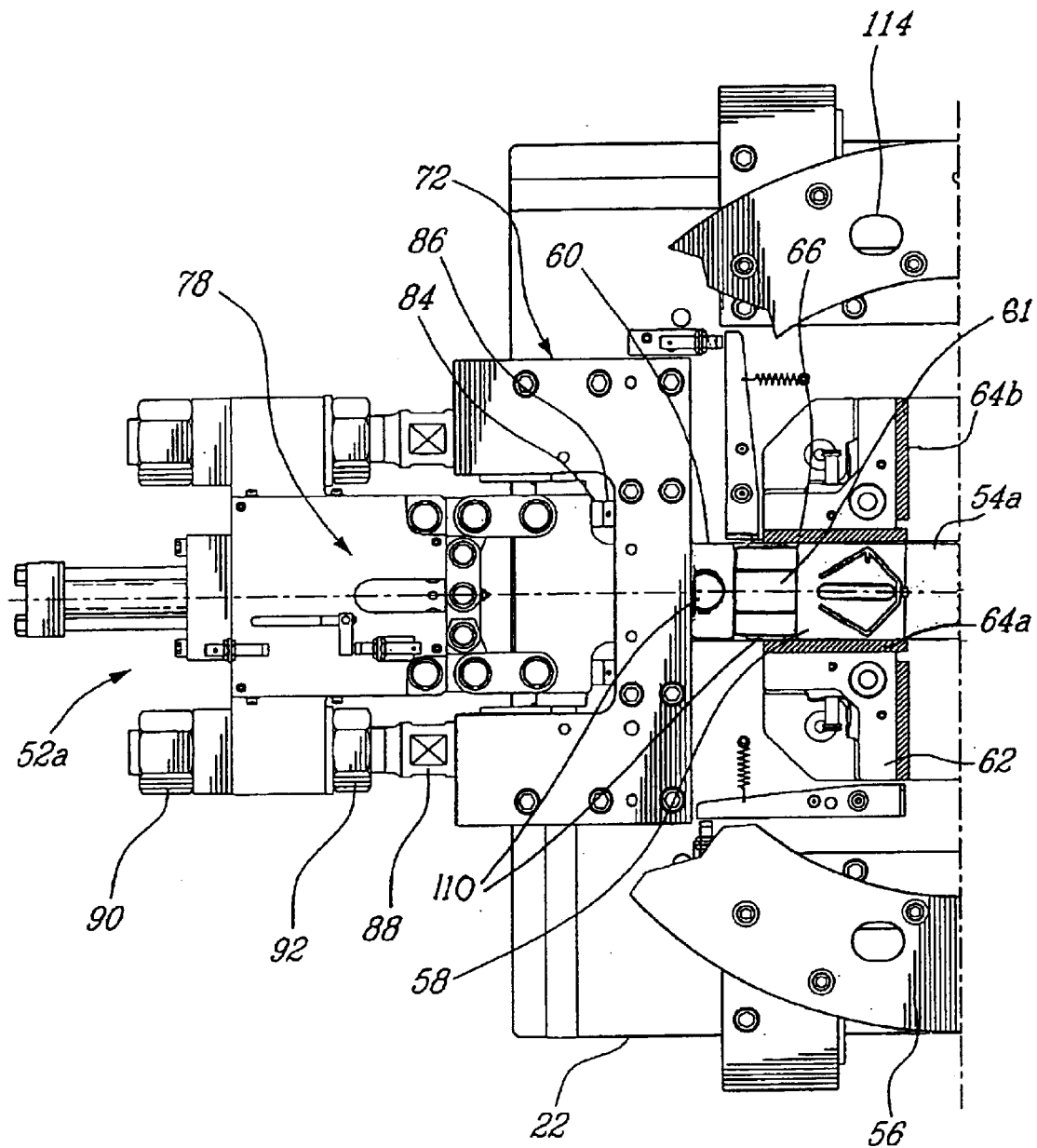
FIG. 3 is an enlarged segmental view of FIG. 2, showing more details of one clamping assembly.
Figure 4:
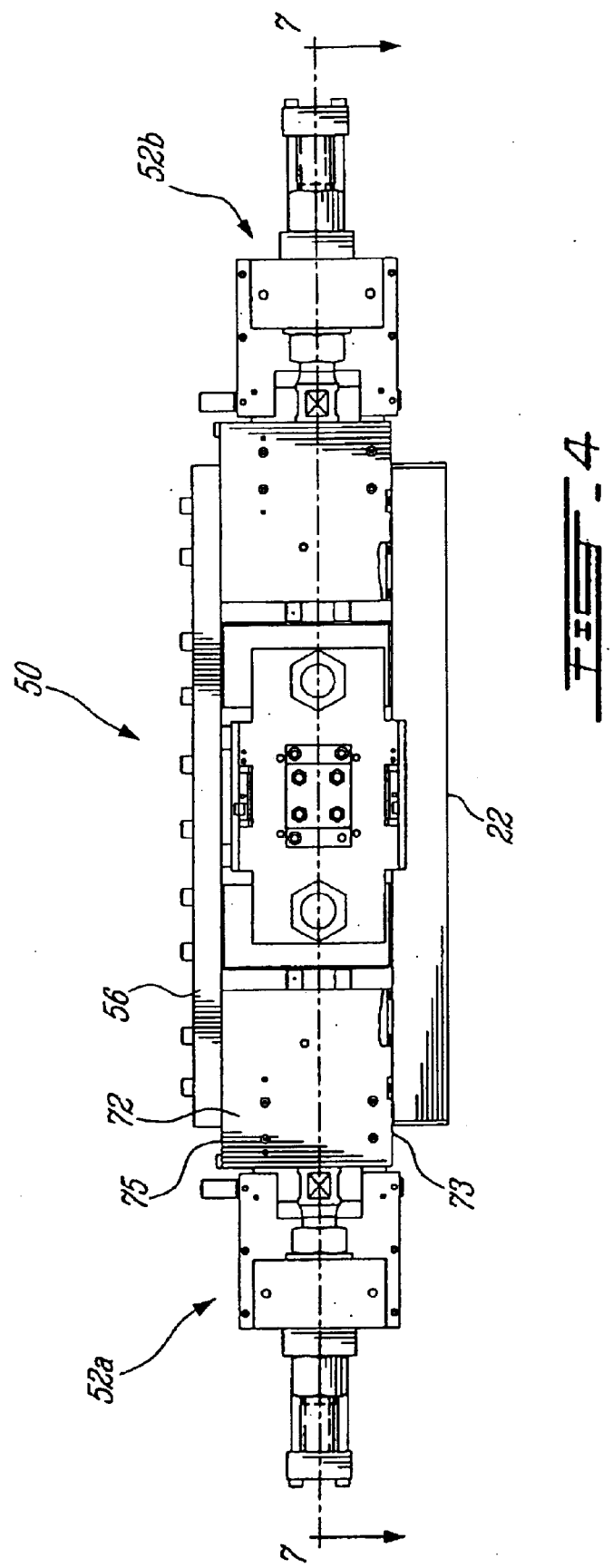
FIG. 4 is a top view of the molds clamping system shown in FIG. 2.

In FIGS. 2 through 4, there is shown a mold clamping system generally indicated at 50 and which is supported on the front side of the base plate 22. The mold clamping system 50 includes four clamping assemblies 52a, 52b, 52c and 52d acting on each of the four mold sections 54a, 54b, 54c and 54d. Each individual clamping assembly with its associated mold section is called a function or slide. Usually for a typical molding application, the mold clamping system 50 includes a main clamping pair of functions and a pair of core functions. After the main clamping pair of functions are closed, the core functions are then closed in order to place the mold sections in a molding position. In the embodiment of the invention shown in FIG. 2, the main clamping pair of functions are clamping assembly 52a with mold section 54a, and clamping assembly 52b with mold section 54b; and the core functions are the clamping assembly 52c with mold section 54c and the clamping assembly 52d with mold section 54d. The functions are actuated in a sequence and a typical closing sequence is mold section 54b, mold section 54a, mold section 54c and mold section 54d.

When the mold sections 54a, 54b, 54c and 54d are closed, the functions are preloaded and all the components of the clamping assemblies 52a, 52b, 52c and 52d are stressed to prevent the mold sections from moving back when the pressurized melting metal is injected into the cavity between the mold sections. It is important that the contact surfaces of the two main mold sections 52a and 52b do not move because it constitutes the reference plane of the whole mold assembly. The contact plane is called the main parting line. As shown in FIG. 3, the clamping assemblies are mounted on the base plate 22, the centre line of the mold being higher than the centre line of the base plate 22 so that the clamping force will cause the base plate 22 to bend. In a standard multiple-slide machine, the deflection of the base plate is not to be ignored because the pre-load force has to be higher than the reaction force induced by the injection pressure which may be in several dozen of tons. Therefore, a reinforcement flat ring 56 is bolted to the mold clamping system 50, interconnecting the individual clamping assemblies 52a, 52b, 52c and 52d to inhibit the deflection of the base plate 22.

For a detailed description of the clamping assemblies, the clamping assembly 52a is illustrated in detail in FIG. 3. The mold section 54a is connected to a first end of a shank 58 which is connected at a second end thereof to a ram 60. The shank 58 is slidable in a guide member 62 which is illustrated as a whole in FIG. 2. The guide member 62 defines two guideways 64a and 64b crossing and perpendicular to each other. The shank 58 is slidably guided between two wearing plates 66 in one end of the guideway 64a.

A U-shaped bracket 72 including a first surface 73 secured to the base plate 22 and a second surface 75 remote from the base plate 22, as shown in FIG. 4. The flat ring 56 is connected to the second surface 75 of the bracket 72 so that the clamping assembly 52a is operatively secured between the base plate 22 and the flat ring 56.

Figure 5:
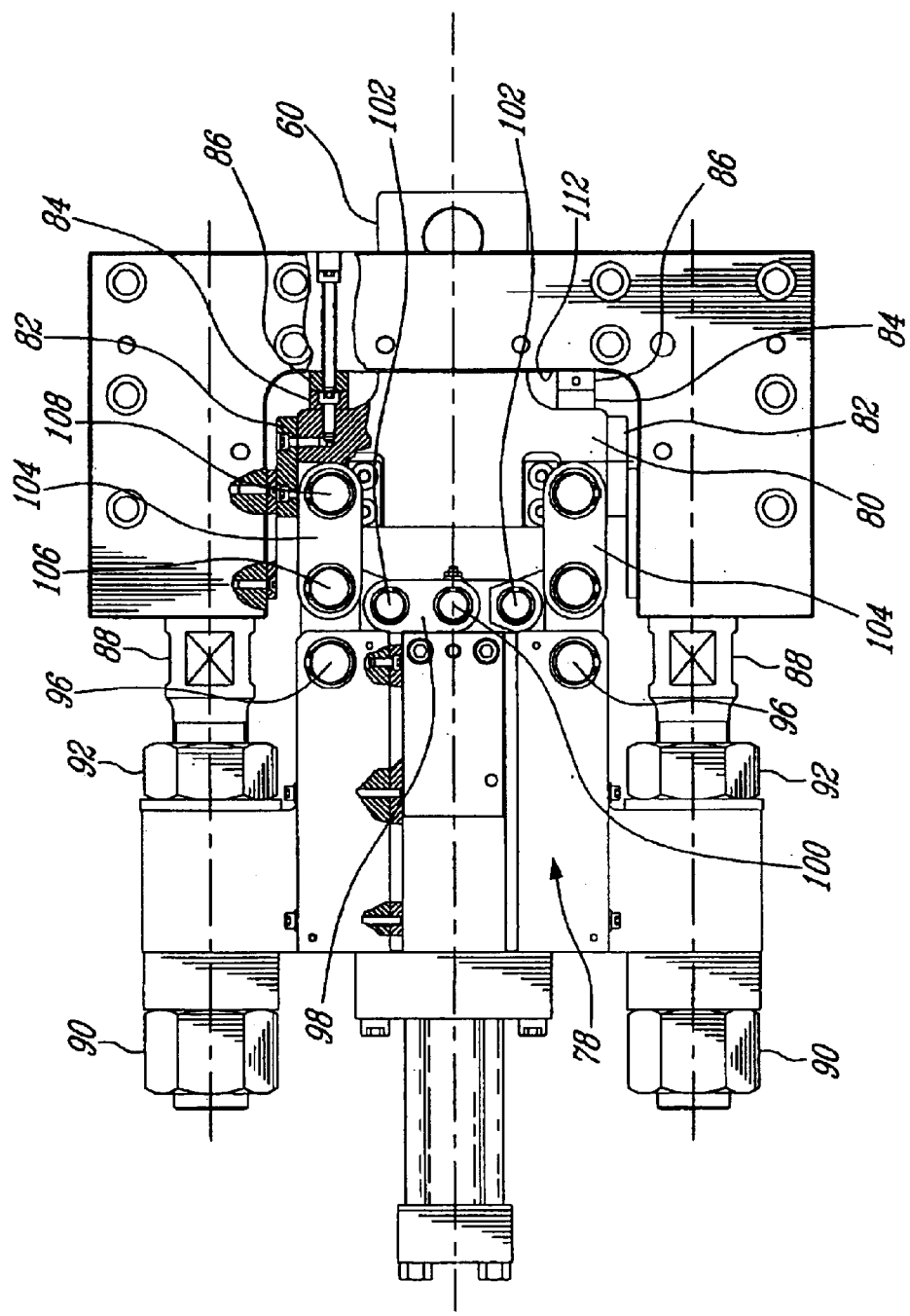
FIG. 5 is a front view of the clamping assembly secured by the bracket as illustrated in FIG. 2, in an enlarged scale showing an advanced position thereof.
Figure 6:
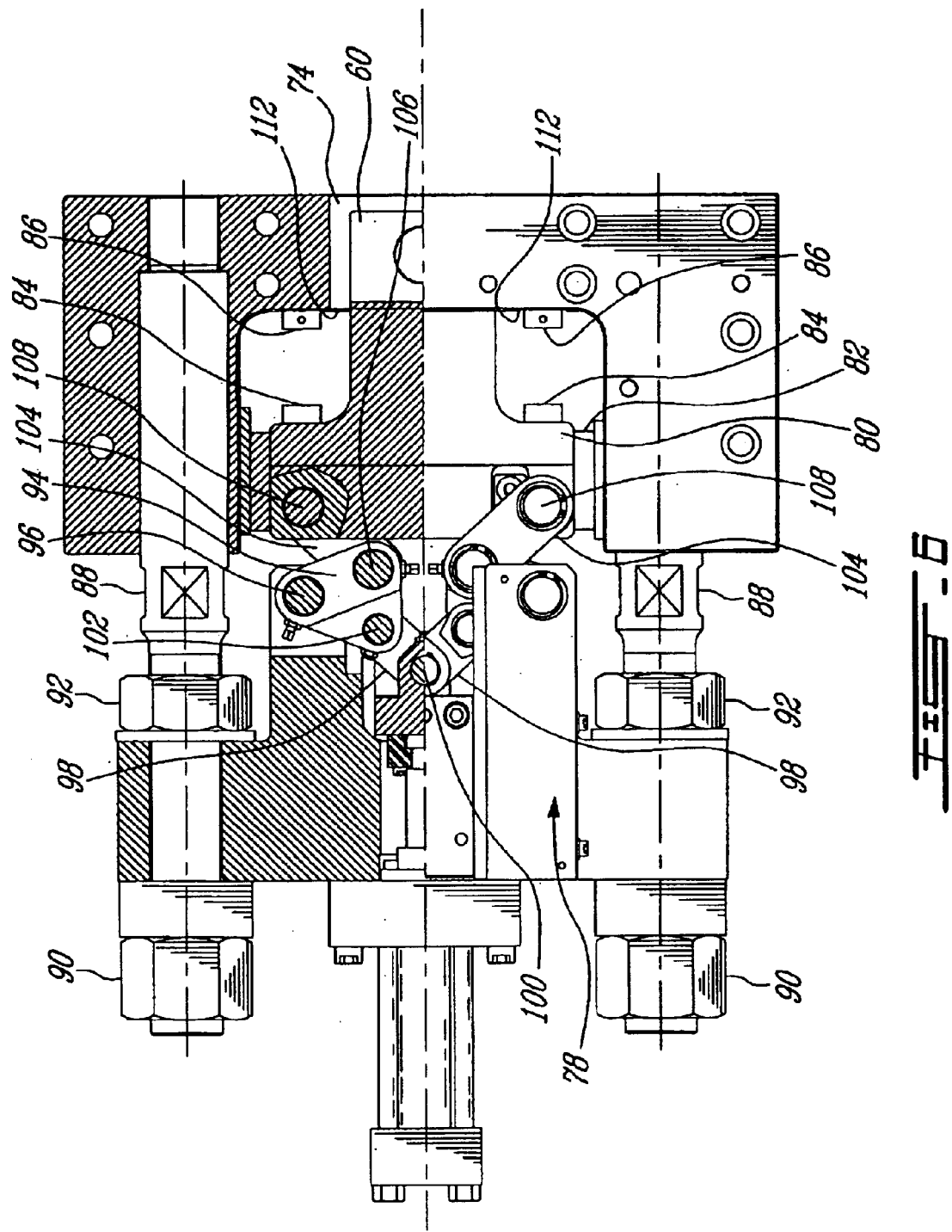
FIG. 6 is a front view of the clamping assembly secured by the bracket as illustrated in FIG. 2, partially in a cross-sectional view taken along line 7—7 in FIG. 4, showing a retracted position thereof.
Figure 7:
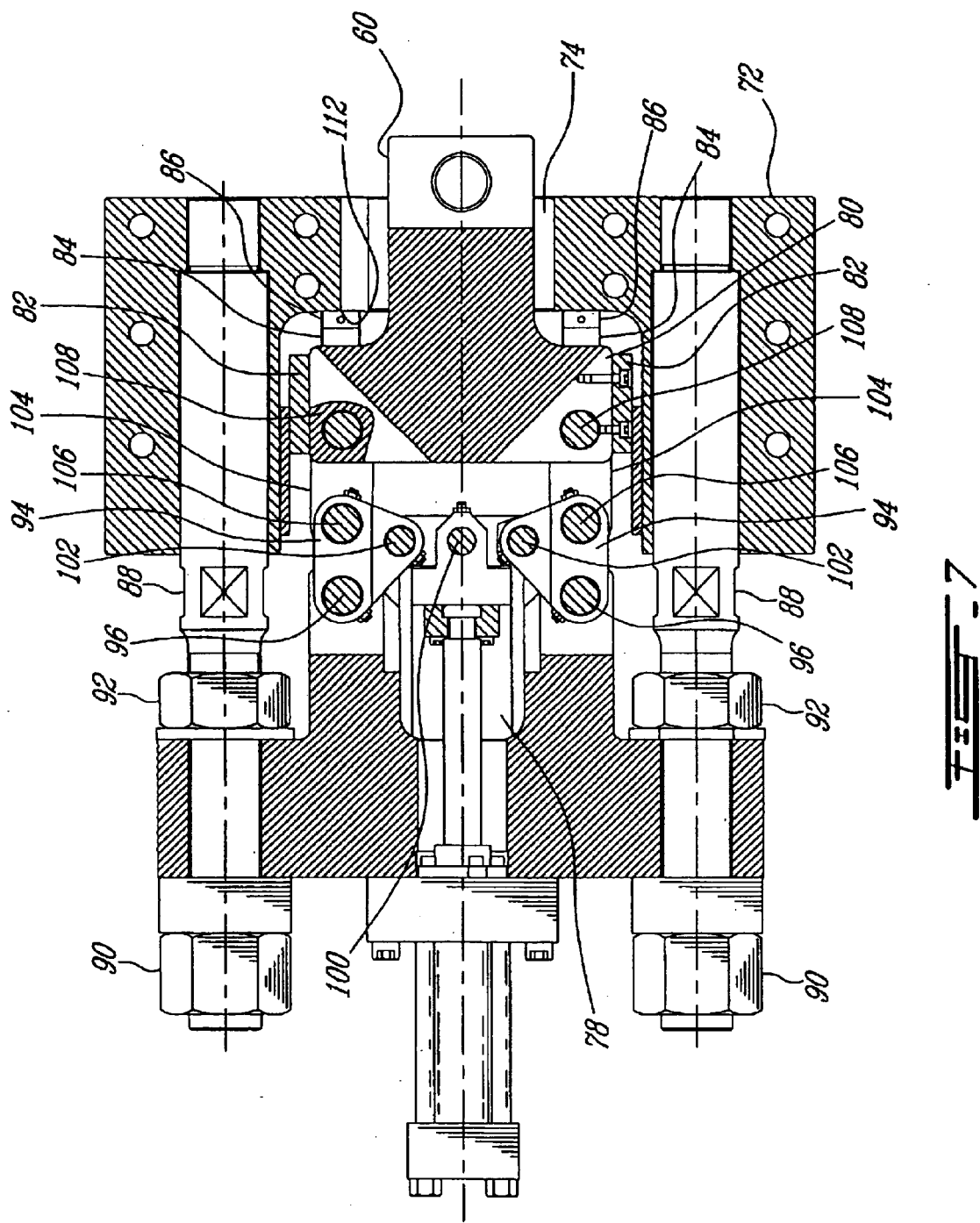
FIG. 7 is the cross-sectional view of the clamping assembly secured by the bracket taken along line 7—7 in FIG. 3, showing the advanced position thereof.

In FIGS. 5 through 7, the ram 60 extends through a centre opening 74 in the bracket 72 and connected to a clamping mechanism 78, such as a toggle, hydraulic cylinder or any alternate force generating device. The ram 60 has a head portion 80 including two opposed sides to which two wearing plates 82 are attached respectively. The two wearing plates 82 are in contact with and guided by the U-shaped bracket 72 when the ram 60 is axially moved with respect to the bracket 72. A pair of stops 84 are provided on the head portion 80 of the ram 60, and a pair of stops 86 on the bracket 72. The mold section 54a stops in its advancing movement when the stops 84 abut the stops 86 to insure an accurate molding position of the mold section 54a. More importantly, with such an arrangement a substantial portion of the clamping force is applied to the bracket 72 rather than the guide member 62 so that the preloaded state will not affect the accuracy of the guide system. The clamping mechanism 78 is adjustably secured to the bracket 72 using a pair of tie-bars 88, retaining nuts 90 and jam nuts 92.

The clamping mechanism 78 is now described in detail. A group of triangle link plates 94, spaced apart from each other, are provided at each side of the clamping mechanism 78, but only one at each side is shown. The triangle link plates 94 at each side is pivotally mounted by a pin 96 to a stationary part of the clamping mechanism 78. A group of elongated link members 98 are pivotally connected at one end thereof by a pin 100 to a moving part of a clamping mechanism 78 and pivotally connected at the other end thereof by a pin 102 to the respective triangle plates 94. Similarly, a group of elongated link members 104 are pivotally connected at one end thereof by a pin 106 to the respective triangle link plates 94 and are pivotally connected at the other end thereof by a pin 108 to the head portion 80 of the ram 60. With such an arrangement, when the moving part of the clamping mechanism 78 advances or retracts, the link members 98 transfer the translation of the moving part of the clamping mechanism 78 to a rotation of the triangle link plates 94 about the pin 96, while the link members 104 translate the rotation of the triangle link plates 94 to a translation of the ram 60. FIGS. 5 and 7 show the ram 60 in an advanced position and FIG. 6 shows the ram 60 in a retracted position. The translation of the moving part of the clamping mechanism 78 is permitted in misalignment from the translation of the shank 58 through a coupling member 76' (see FIG. 2) which is secured to the ram 60.

Stops 84 and 86 must be adjusted when the mold has been changed for different products. The clamping mechanism 78 and the ram 60 are positioned in the retracted position. The shank 58 is placed between the wearing plates 66 in the one end of the guideway 64a of the guide member 62. The shank 58 is coupled to the ram 60 by two pivots 110 and a coupling 61 (see FIG. 3). The pivots 110 are orthogonally disposed with respect one to another such that the coupling 61 provides two rotational degrees of freedom to the shank 58 with respect to the ram 60. A cover plate (not shown) is assembled on the guide member 62 to cover the guideways. With the jam nuts 92 loosened, the clamping mechanism 78 is manually displaced by sliding it on the tie bars 88, to position the mold section 54a at desired locations with other mold sections. This procedure is effected with the ram 60 in an advanced position. The jam nuts 92 are then tightened. The distance between the ram stops 84 and the bracket stop mounting surface 112 (see FIGS. 6 and 7) is measured. There is an opening 114 (see FIG. 2) in the reinforcement flat ring 56 to do this. The bracket stops 86 are precisely ground to the measured thickness. The clamping mechanism 78 is actuated to the retracted position and the bracket stops 86 are installed to a stop mounting surface 112 of the bracket 72. Finally, the retaining nuts 90 and the jam nuts 92 are tightened. The accurate molding position of the mold section is insured after the stops 86 are adjusted. Similar procedures are applied to adjust the stops of the other main function and the core functions for the accurate molding position of the corresponding mold sections.

The clamping force for the preloaded state also needs to be adjusted before a casting cycle begins. The retaining nuts 90 and the jam nuts 92 are loosened when the clamping mechanism 78 is in the retracted position. The clamping mechanism 78 is brought forward by turning the retaining nuts 90 manually, both the retaining nuts 90 on the two tie bars 88 being turned equally. The clamping mechanism 78 is then actuated with the ram stops 84 and bracket stops 86 in contact. The clamping force amount indicated by the load indicators (not shown) at the end of the tie bars 88 is carefully checked to ensure that the two readings are equal. If the two readings are not equal, the clamping mechanism 78 should be returned to the retracted position and the retaining nuts 90 are readjusted until the two readings are equal. The above procedure is repeated step-by-step until the desired clamping force is obtained. Finally, the jam nuts 92 are tightened with the clamping mechanism 78 in the clamped position where the stops 84, 86 are in contact. The clamping force of the other main function and the two core functions are adjusted in a similar manner. The clamping force for the core functions usually is much smaller than the clamping force for the main functions.

It is noted that the clamping force must be adjusted greater than the minimum value required for flash-free molding without exceeding predetermined maximum levels.

Figure 8:
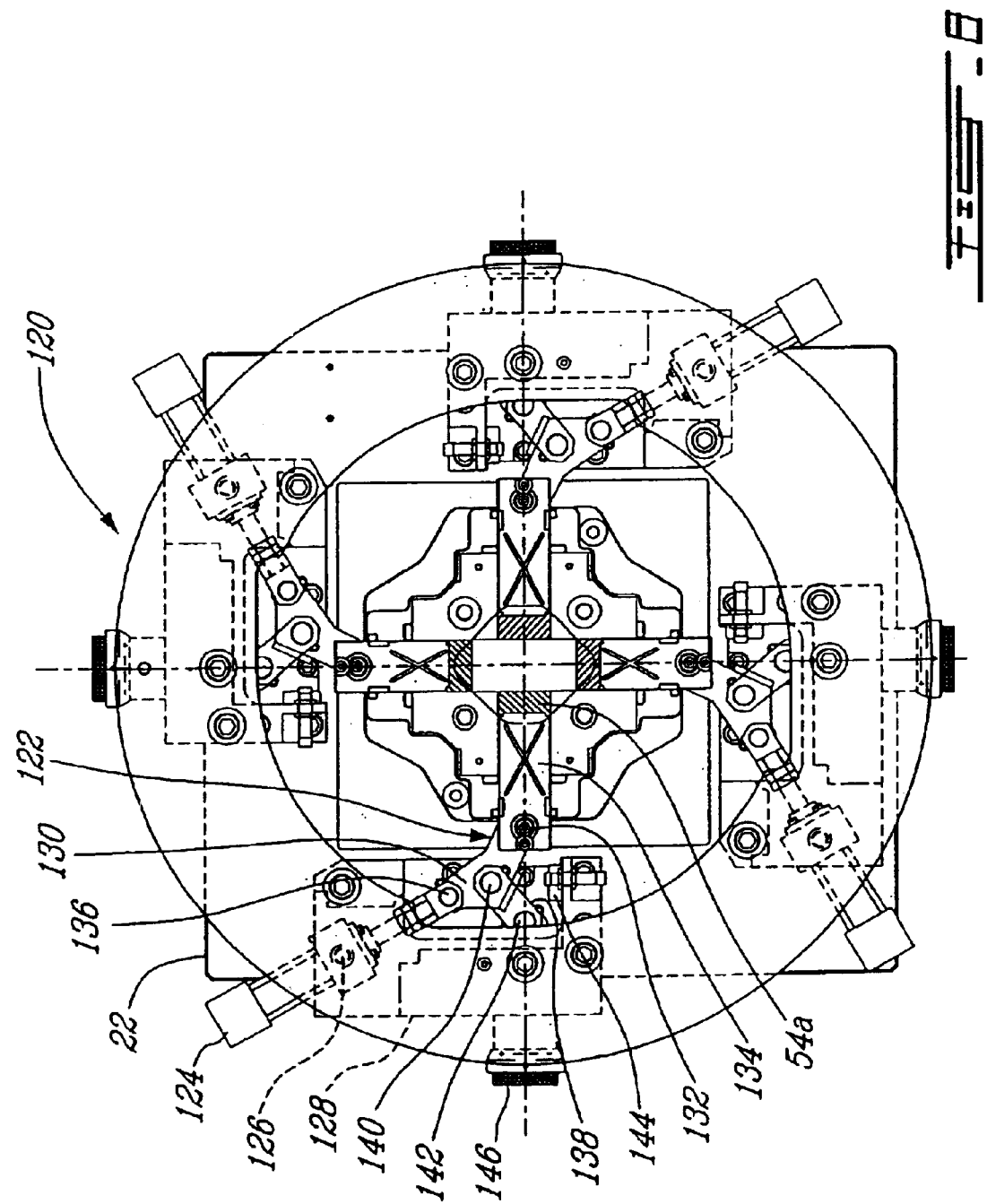
FIG. 8 is a front view of another embodiment of the mold clamping system adapted to be mounted on the machine shown in FIG. 1.

In FIG. 8, another embodiment of the clamping system 120 is illustrated. The clamping system 120 works on the same principle as the clamping system 50, and has a similar structure as the clamping system 50 except that there are no tie-bars. The clamping assembly 122 is directly mounted on the bracket 128 and is arranged differently, simple link assembly instead of a multiple link assembly. An adjusting mechanism (not shown) is provided between the bracket and clamping assembly to adjust the clamping force. It is more convenient to provide a frame structure to pivotally support the base member 22, similar to the configuration illustrated in FIG. 1.

The structures and functions of the clamping system 120 are similar to those of the clamping system 50 and will not further be described to avoid redundancy, and only the clamping assembly 122, with associated elements, is briefly described below.

The clamping actuator 124 is pivotally mounted by a pin 126 to the bracket 128. An elongated link member 130 is pivotally connected at one end thereof by a pin 132 to the shank 134 and is pivotally connected at the other end by a pin 136 to the moving part of the clamping mechanism 124. An elongated link member 138 is pivotally connected at one end thereof by pin 140 to the middle portion of the link member 130 and pivotally connected at the other end thereof by a pin 142 to a member which (not shown) is in a relatively fixed but adjustable relation to the bracket 128. When the moving part of the clamping mechanism 124 is advanced or retracted along its centre line, both the clamping actuator 124 and the link member 130 are forced to rotate in opposite direction about the respective pins 126 and 132. The rotation of the link member 130 also forces the link member 138 to rotate about the pin 142 in an opposite direction so that the shank 134 is forced in translation along its centre line because the pin 142 is in a fixed relation with the bracket 128. A stop member 144 is adjustably mounted to the bracket 128 to stop the rotation of the link member 130 when the shank 134 moves the mold section 54a in the molding position. A screw knob 146 is operatively secured on the bracket 128 and adapted to adjust the position of the pin 142 relative to the bracket 128 so that the clamping force can be adjusted.

The injection system 28 of the machine 20 shown in FIG. 1 is controlled by a unique control system which is adapted to be selectable for an open loop control mode or a closed loop control mode. The system is adapted to be switched from one mode to the other depending on the type of mold being installed on the machine. If the product to be molded needs a short injection stroke, a closed loop can be very difficult and sometimes impossible to adjust. That is where the open loop control mode can be selected, and adjusted to control the injection cylinder in a very simple way. The selection is not automatic. It is the user who decides which control mode will be used for which mold. The control system also controls the functions of the mold clamping system as described above. However, the novel and inventive features of the present invention relates to the control of the injection cycle, and particularly to the selection of an injection control mode depending on the type of product to be molded. Therefore, the description of the control system will only be focused on the functional features and hardware for the injection system. All molding sequences and injection parameters are selected and then saved on the local hard disk of the computer so that they can be retrieved later for production.

Figure 9:
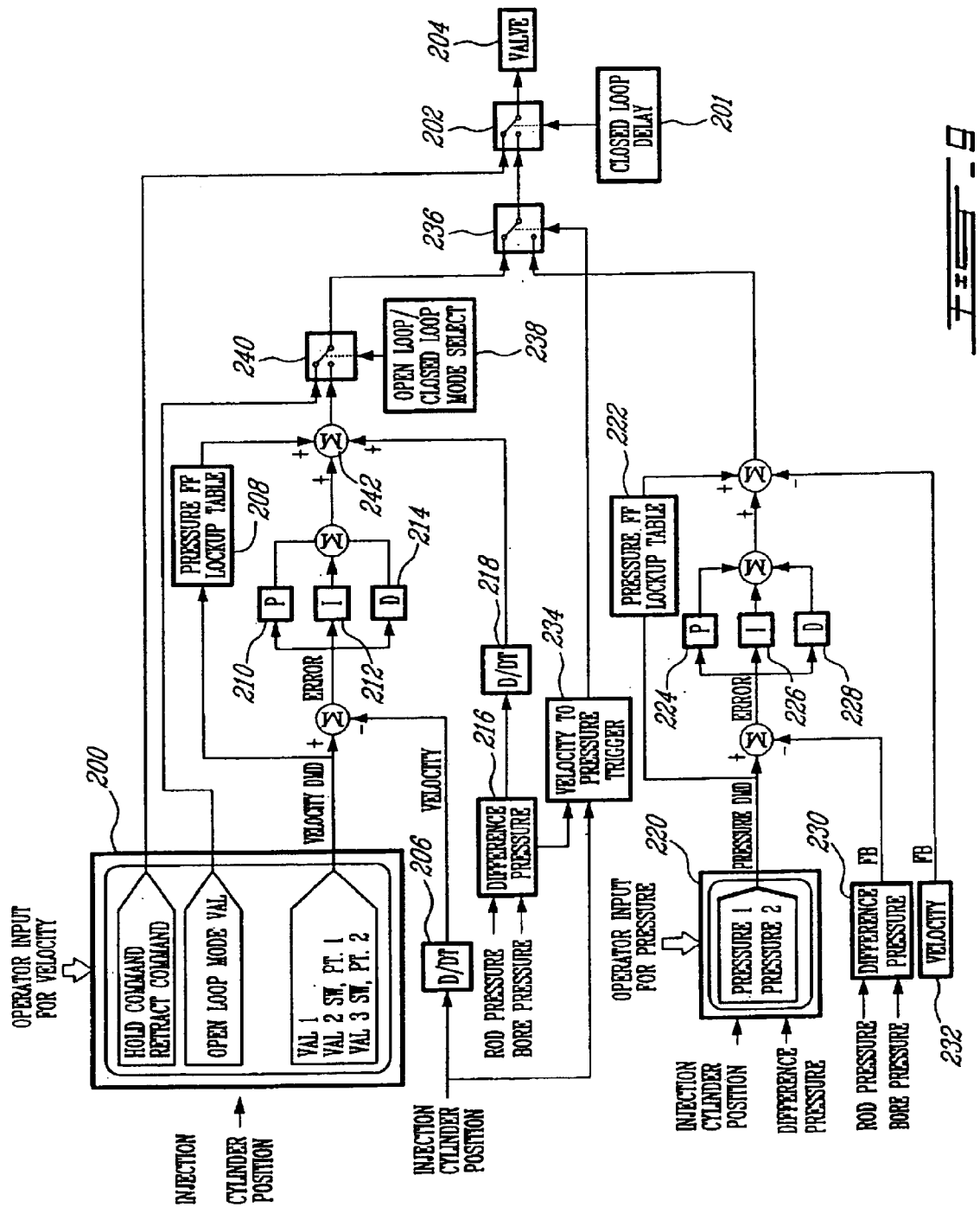
FIG. 9 is a control functional diagram, illustrating a control system used for controlling the injection cycle of the machine shown in FIG. 1.

In FIG. 9 there is shown a function control block diagram illustrating the function of the control system for the injection system shown in FIG. 1. Generally, a closed loop control system uses a measurement of the output and feeds back this signal to compare it with the command. The closed loop control is composed of a velocity phase and a pressure phase. The transition from the velocity phase to the pressure phase is based upon a position called the switch point.

During the cavity fill phase in which the molten metal is injected into the cavity of the mold and the cavity has not been fully filled, the velocity of the injection plunger 34 is controlled to give the best filling characteristics for the mold. Three variable velocity profiles can be programmed through an operator input as indicated in block 200. A hold command in block 200 is executed immediately before the closed loop velocity control is initiated, which is achieved through a programmable delay shown in block 201 controlling a software switch 202. The programmable delay 201 accounts for the changes in the hydraulic system pressure due to the opening of a cartridge valve which controls the hydraulic fluid supply to the hydraulic cylinder 32 in FIG. 1.

The cylinder piston position (or the position of the injection plunger 34) is differentiated by a velocity estimator indicated in block 206 to obtain the cylinder velocity. This velocity is compared to the demand velocity and the error is minimized by the control algorithm. The closed loop velocity control algorithm includes a velocity feed forward term shown in block 208 and the closed loop PID terms as indicated by the blocks 210, 212 and 214. The feed forward term 208, based on a pre-constructed valve signal and a corresponding flow gain curve, compensates the system for velocity demand setpoint changes. Letter P in block 210 stands for velocity loop proportional gain, I in block 212 for velocity loop integral gain and D in block 214 stands for velocity loop derivative. The closed loop PID terms are used to reduce steady state errors and control the system transit response. The "difference pressure" block 216 calculates the difference between the bore pressure and the rod pressure of the injection cylinder (net pressure). The net pressure is differentiated by block 218 and the value inserted in a summing junction block 242, to increase the command to the servo-valve 204. This compensates for the increase in metal pressure during filling of the cavity. Without such compensation, the injection plunger would slow down.

During a compaction phase which begins at the moment when the cavity of the mold is just fully filled with the molten metal and pressure of the molten metal beings to build up, the injection piston of the hydraulic cylinder is controlled in the pressure mode, and decelerated rapidly to greatly reduce the hammer effect. This is achieved without increasing injection cycle time. Two variable pressure profiles can be programmed as indicated in block 220.

The two separate, programmable pressure demands are related to a corresponding switch point based on time (not shown). The closed loop pressure control algorithm includes a feed forward term, shown in block 222 and closed loop PID terms 224, 226 and 228. The feed forward term 222 based on a pre-constructed valve signal and corresponding pressure gain curve, compensates the system for pressure demand setpoint changes. The closed loop PID terms 224, 226 and 228, standing for pressure loop proportional gain, pressure loop integral gain and pressure loop derivative respectively, are used to reduce steady state errors and control the system transient response. A difference in pressure shown in block 230 between the rod pressure and the bore pressure of the hydraulic cylinder is used as feedback to the closed loop pressure algorithm to be compared with the pressure demands, and the errors are minimized by the algorithm. Velocity feedback indicated by block 232 is also used in the pressure phase.

The transition from the closed loop velocity phase to the closed loop pressure phase is made in a repeatable, controlled manner in order to achieve optimal, stable system performance, resulting in premium product quality. The transition is based on a position setpoint shown in block 234 to trigger the switching from the velocity phase to the pressure phase as indicated in block 236.

In both velocity and pressure phases, the injection plunger 34 is actually controlled in real time, by frequent comparison of actual values with required values, and precise control of the outflow of a hydraulic fluid from the injection cylinder.

The closed loop control permits maximum use to be made of the power of the injection system, while minimizing flash. It can also eliminate the costly secondary operation of trimming to remove flash. For example, high injection pressures and velocities are required to fill products that are to be plated. With open loop control, such velocities and pressures result in large spikes in metal pressure during the compaction phase, which can cause serious flash. The pressure spike also limits the useable surface area of the mold because it limits the size of the product and/or number of cavities that can be cast.

Set-up of the closed loop control system according to the present invention is user friendly. The switch over point from velocity phase to pressure phase is initially based on theoretical shot weight, then fine tuned by taking a few trial shots and observing the pressure and displacement profiles during compaction.

All settings of the closed loop injection system for any given mold can be saved on the hard disc of the die-casting machine control unit, along with mold sequence. A Maximum Net Pressure Error is monitored during the velocity phase of the injection cycle and can generate an alarm message in the control system. This indicates that too much pressure has been required to fill the cavity of the mold in the velocity phase. It can be caused by a nozzle temperature setpoint being too low.

In the open loop control mode, the cylinder piston moves relatively constant in accordance with a constant command from block 200 sent to the servo valve 204. The demand velocity in a percentage form is sent from a PC to a controller which will be described hereinbelow with reference to FIG. 10, and then the injection-down command is sent to start the motion.

The programmed velocity PID terms, feed forward terms, ramps and the pressure loop are not used. Only a single voltage command is sent to the servo valve 204. The selection for the open loop control or the closed loop control is manually done as illustrated in the blocks 238 and 240.

Figure 12:
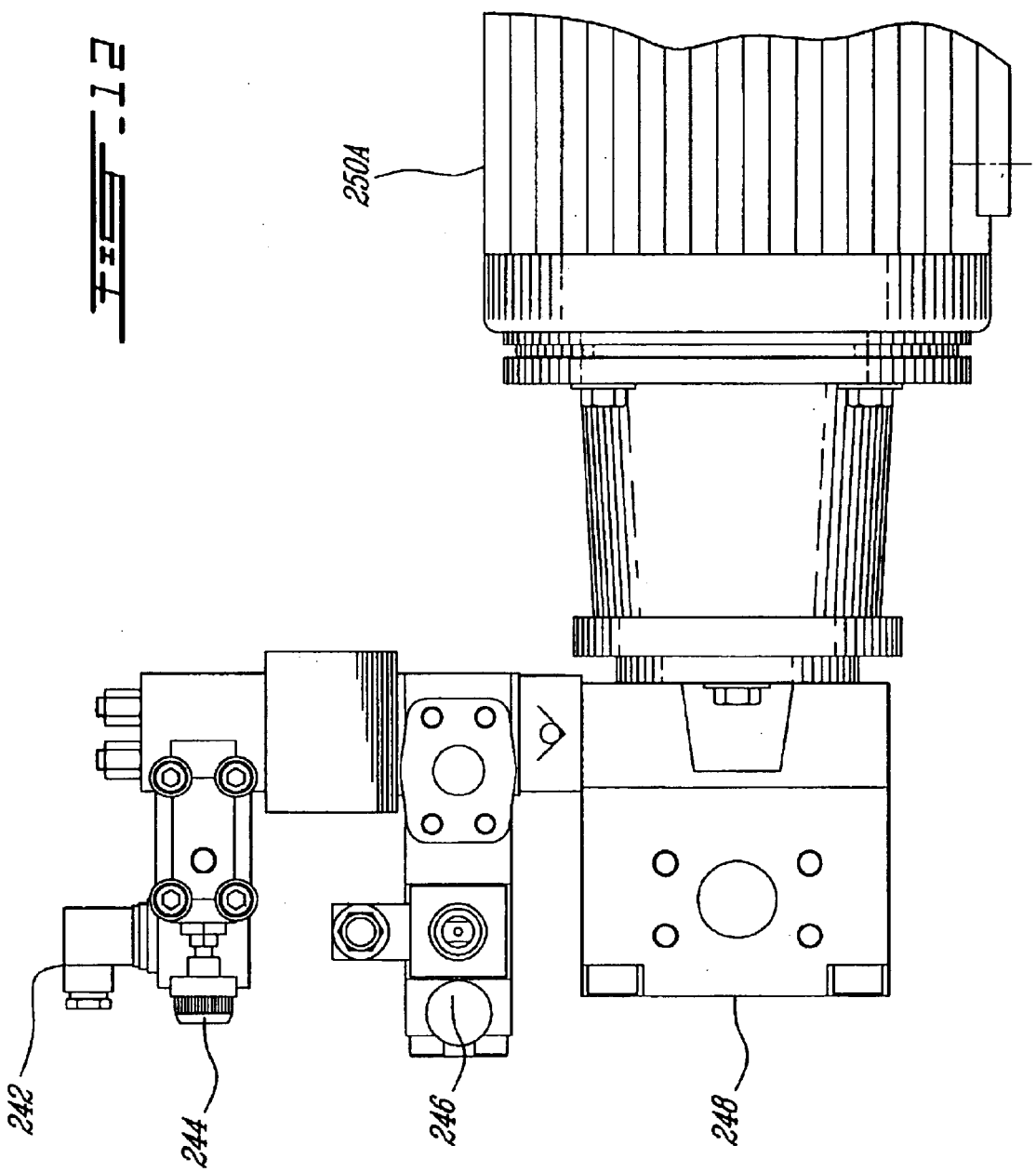
FIG. 12 is a schematic view of a pump and valve assembly used for the control system illustrated in FIG. 10.

Retraction velocity is also performed in open loop, pre-determined and input by the operator as shown in block 200. The open loop control mode is particularly used when a small product is cast because the injection system needs a certain minimum of stroke to be able to react on and profile the injection when the closed loop control mode is used. When a small product has to be cast on the machine, requiring an injection stroke smaller than the minimal stroke, the operator can simply switch the injection system from the closed loop control mode to the open loop control mode, instead of having to proceed with effecting a major change to the gooseneck to install a smaller diameter sleeve which will require a longer stroke to fill the same product. This advantage compared to conventional machine allows the machine to be more flexible in operation. As shown in FIG. 12, when the open loop control mode is activated, the solenoid valve 242 is automatically activated to enable the reduced injection pressure pre-set on a pressure reducing valve 244. The solenoid valve 242 is deactivated in the closed loop control mode and the hydraulic fluid is supplied to the injection system under full pump pressure, which is manually adjusted by a pump pressure regulator 246 mounted on the pump 248. The pump 248 is driven by a motor 250A. The reduced injection pressure set on the pressure reducing valve 244 for the open loop control mode is adjusted manually only before an injection cycle begins.

The open loop control mode is also used for linear transducer calibration. If a sequence is programmed in the closed loop control mode, the injection system is automatically changed to the open loop control mode when the linear transducer calibration procedure begins. This permits easy calibration by the operator without requiring the use of special voltage generator typically needed to move the injection cylinder.

The open loop control mode can be used as a manual mode. If a sequence is programmed in the closed loop control mode, the injection system is automatically changed to the open loop control mode when actuating a manual mode window in the system. This permits the movement of the injection cylinder with a known open loop command. In the manual mode the closed loop control mode is not used because the physical state of the injection could be different from the injection in real production. Open loop command insures that a stable and a known command be applied constantly to the valve, which is not the case in the closed loop. This feature provides security to the operation of the injection system and the machine as a whole.

Figure 10:
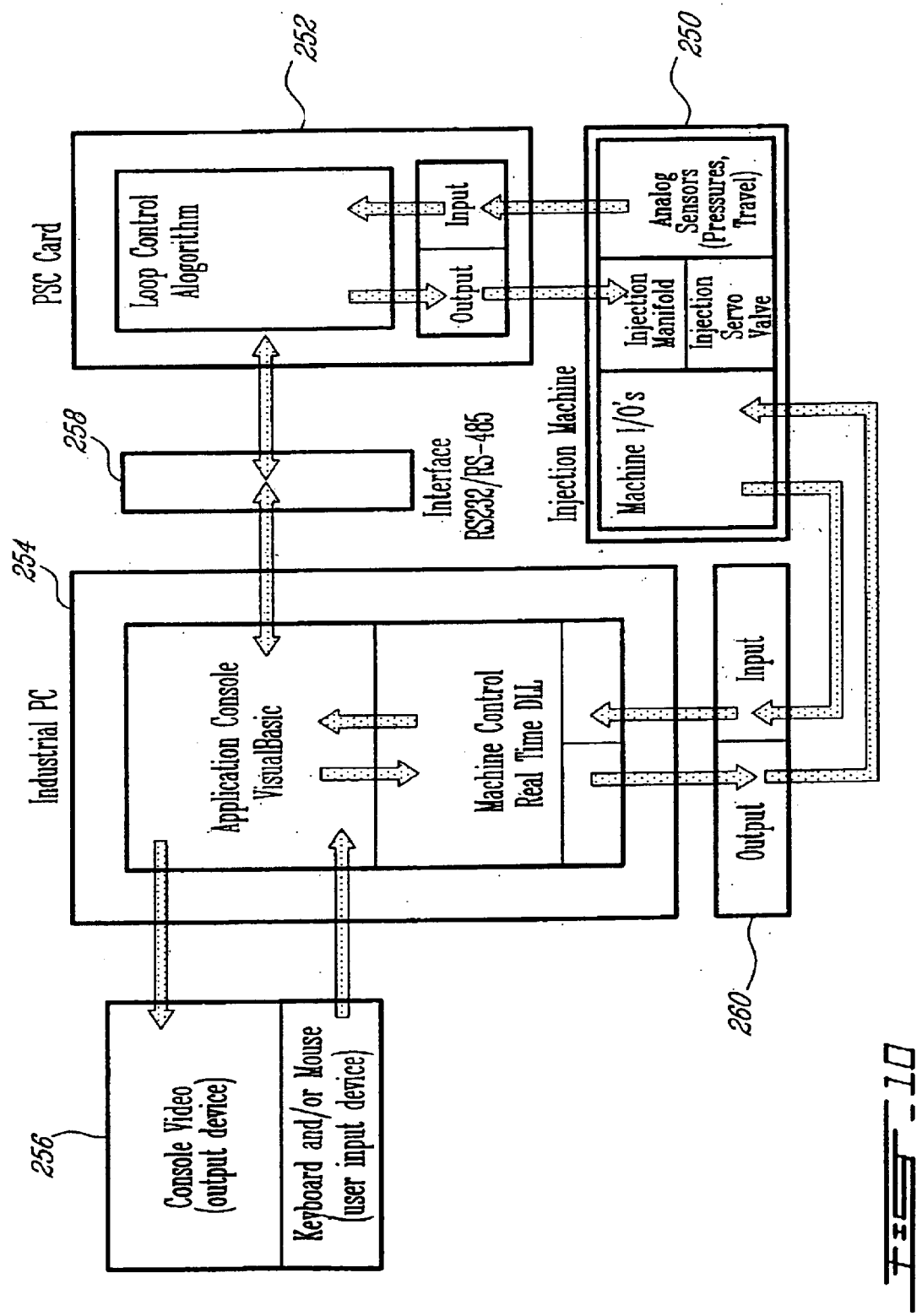
FIG. 10 is a configuration diagram, illustrating the structure of the control system used for controlling the injection cycle of the machine shown in FIG. 1.

FIG. 10 illustrates the main elements of the control system which includes the injection machine 250, a controller 252 that is programmable servo controller (PSC) card, the industrial PC 254 and a user interface device 256 attached thereto.

The industrial PC 254 is hooked to the controller 252 by interface 258, and to the injection machine 250 through the output and input device 260. The primary task of the industrial PC 254 is to interact with the user through the user interface 256 that is a video monitor and a keyboard, to get and show all of the system parameters that are used to control the machine 250. There are two software components running in the memory of the industrial PC 254. The first is an interface written in Visual Basic©, permitting the user to adjust the parameters that control the machine. There are three families of the parameters which include the mold sequence and the timing, such as order of closing and opening, injection parameters, such as velocities and pressures, and general machine parameters, such as greasing system, timeouts, etc. These parameters are written to the second software component, the real time dynamic link library (DLL) written in Visual C©. This software is actually running the machine and is time critical. It is interrupt driven, which means that there is a specific number of events per time unit. In this case the frequency of event is one kilohertz. The real time DLL is also giving back collected and calculated data from machine sensors that are shown in block 250.

Figure 11:
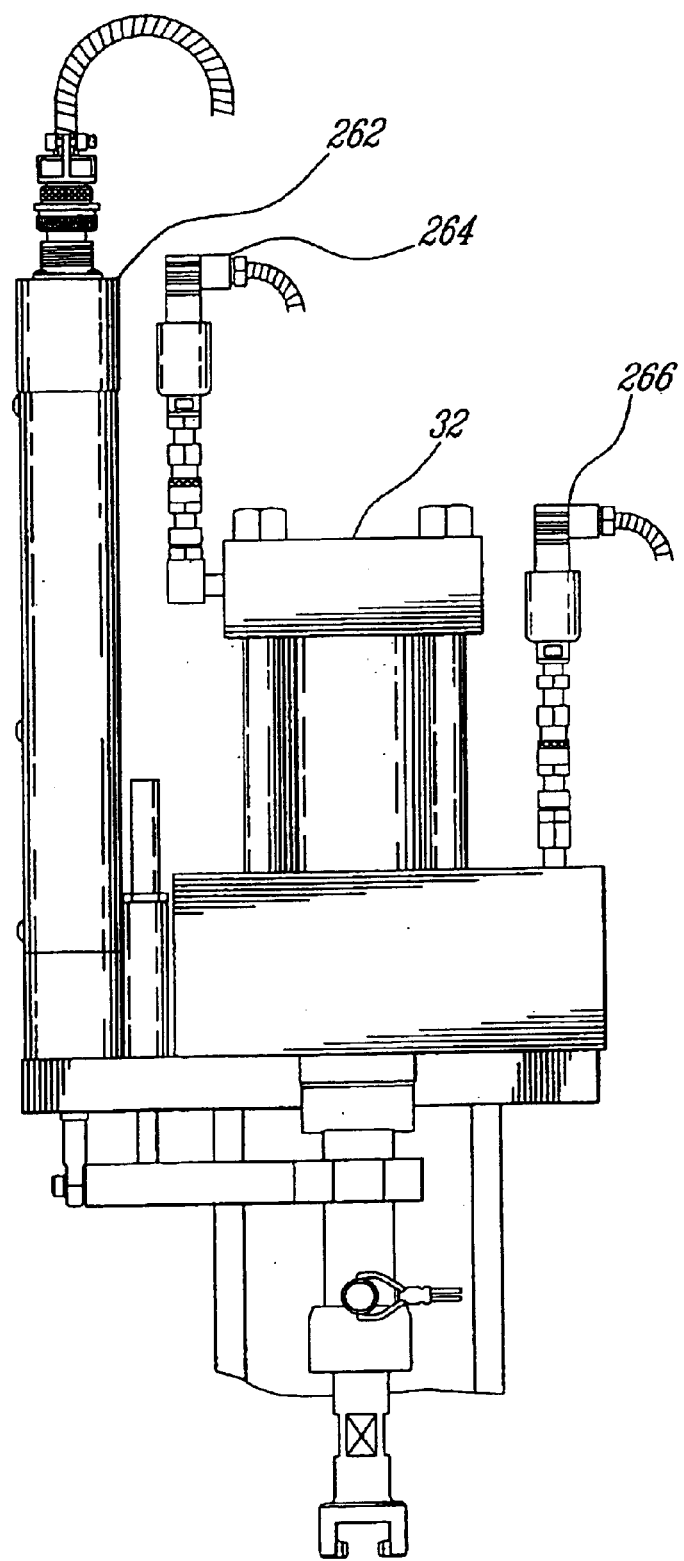
FIG. 11 is a schematic view of an injection cylinder with transducers used in the control system shown in FIG. 10.

The injection parameters sent from the industrial PC 254 take a different path. They are sent to the controller 252, the PSC control card. The data are exchanged between the industrial PC 254 and the controller 252 by the interface 258 which is a serial link, RS232/RS-485 interface. Data go both ways so that the industrial PC 254 is always aware of the controller state. The controller 252 has a specific role to manage the injection system. The controller 252 permits the control of the hydraulic cylinder 32 of FIG. 1 in either open or closed loop and in a very precise manner. The controller 252 controls the fast response time servo valve 204, shown in FIG. 9, using three sensors, as shown in FIG. 11, that include a position transducer 262 to give feedback of the position of the piston of the cylinder 32, and bore and rod pressure transducers 264 and 266 to give the pressures from both side of the hydraulic cylinder 32.

A special injection manifold, as indicated by block 250, is included in the control system to provide a hydraulic circuit for delivering the hydraulic fluid to the hydraulic cylinder and other hydraulic devices to achieve the hydraulic control function illustrated in FIG. 9.

The fast response servo valve 204 of FIG. 9 is included in the block 250 in FIG. 10. The servo valve generally includes a main stage spool, position transducer and a pilot valve. A position control-loop for the servo valve is enclosed by the integrated electronics. An electronic command signal such as a flow rate setpoint is applied to the integrated position controller in the valve which drives the current in the pilot valve coil. The position transducer measures the position of the main stage spool, and the signal is demodulated and fed back to the controller of the valve where it is compared with the command signal. The controller drives the pilot valve until the error between the command signal and feedback signal is zero. Thus the position of the main stage spool is proportional to the electric command signal. The servo valve is also equipped with a fail-safe valve for providing a safe metering spool position in order to avoid potential damage.

It is noted that the particular structure of the servo valve is not part of the inventive features of the invention, and any type of servo valve could be suitable if it meets with the above described general features of the valve and the requirement for the control functions illustrated in FIGS. 9 and 10.

Figure 13:
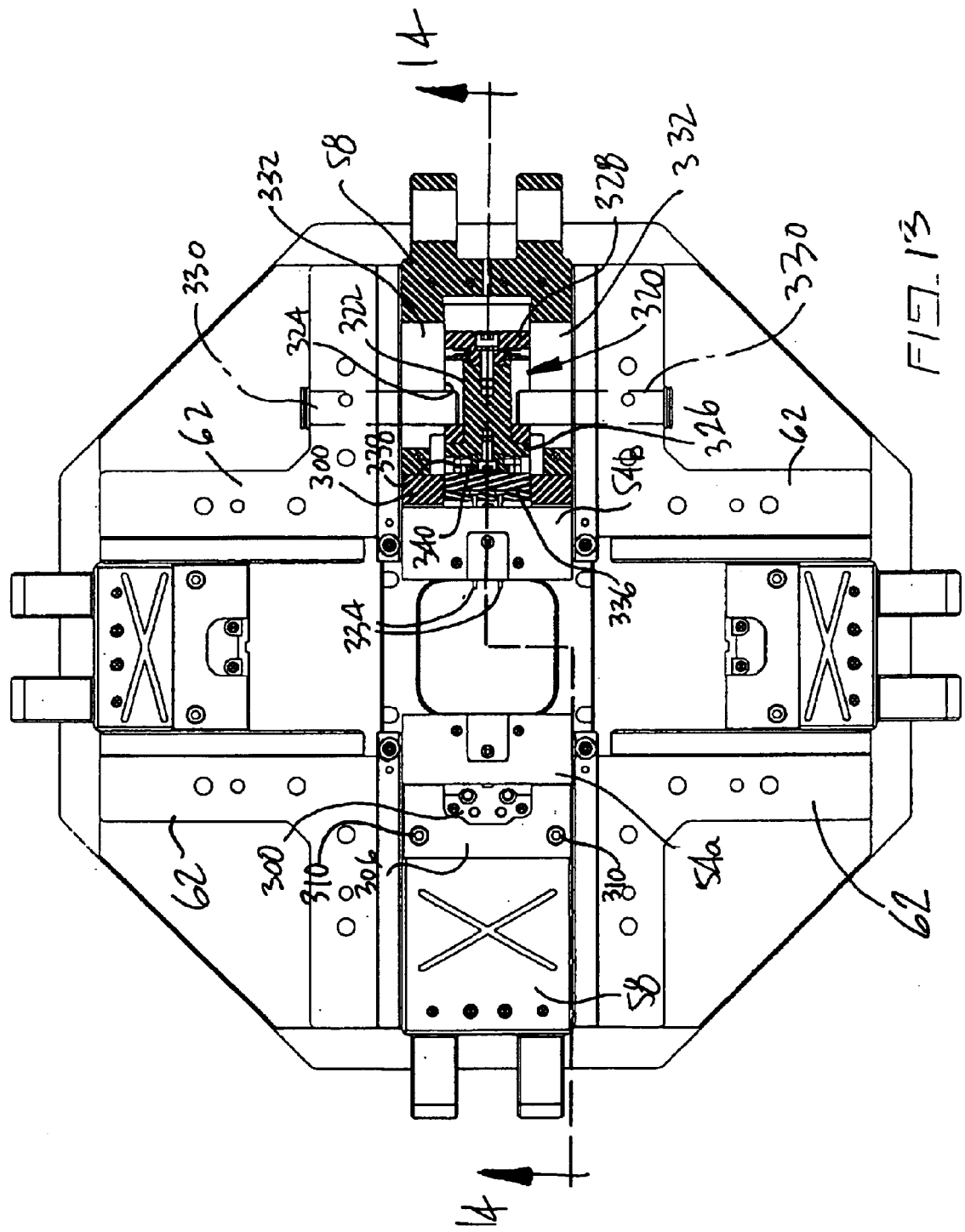
FIG. 13 is a side elevational view, partly cross-sectional, of mold section and shank assemblies according to further embodiments of the present invention.
Figure 14:
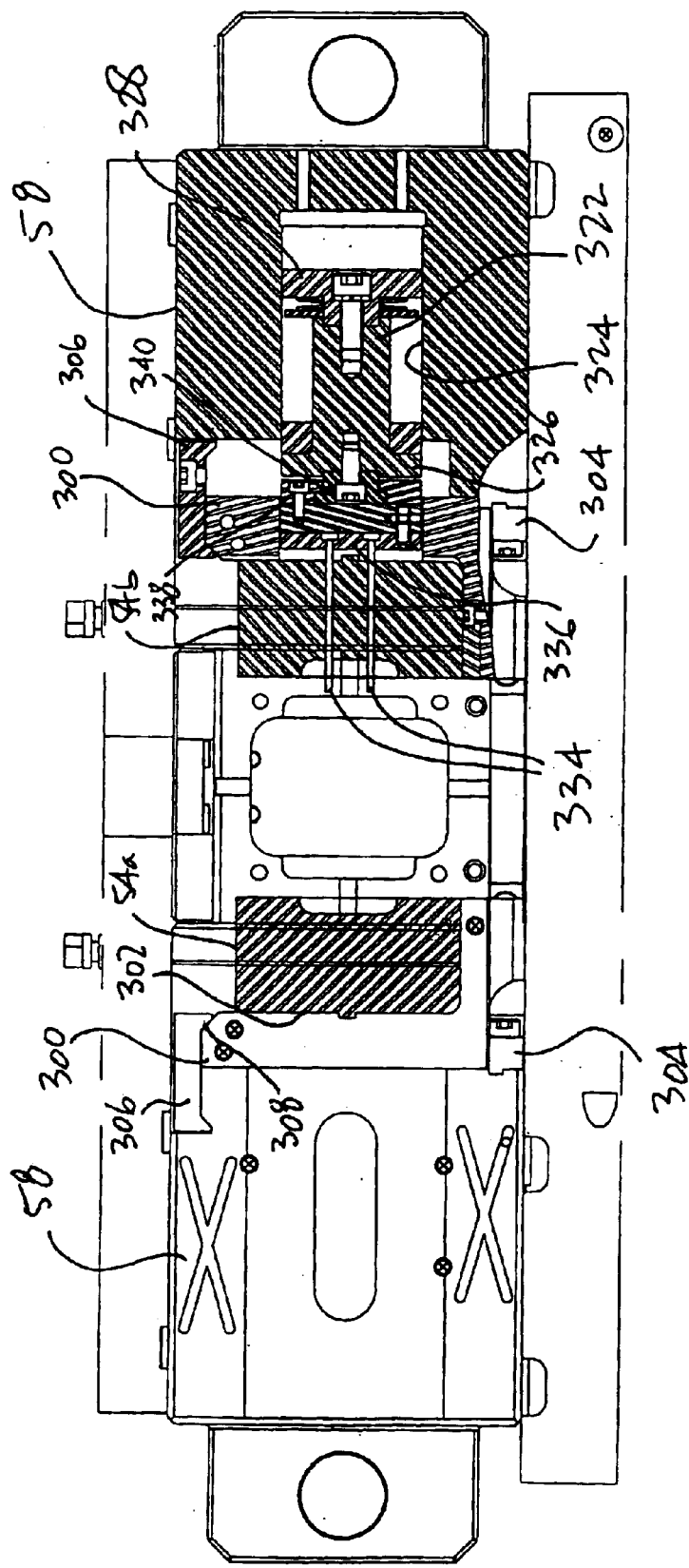
FIG. 14 is a cross-sectional view of the mold section and shank assemblies taken along cross-sectional line 14—14.

Referring now to FIGS. 13 and 14, further embodiments of the present invention are shown which will enable a rapid connection of the mold sections 54 to their respective shanks 58. More specifically, the mold section 54a is connected to the shank 58 through a mounting plate 300, rather than being directly connected to the shank 58. As best seen in FIG. 14, the mold section 54a is detachably mounted to the mounting plate 300. The mounting plate 300 has, on a rear surface thereof, means for engagement with the shank 58. For instance, the mounting plate 300 may be mounted to the shank 58 through a keyway 302 which will substantially prevent vertical displacement of the mounting plate 300 with respect to the shank 58. A positive stop 304, mounted to the shank 58, ensures the horizontal alignment of the mounting plate 300 with respect to the shank 58. This horizontal alignment must be precise, as the mold section 54a must be in alignment with the mold section 54b upon engagement of the two for the molding process.

A clamp 306 is provided in order to secure the mounting plate 300/mold section 54a assembly to the shank 58. The clamp 306 has a bottom surface thereof adapted for covering a portion of the shank 58 and a portion of the mounting plate 300. The clamp 306 has a lip 308 so as to immobilize the mounting plate 300 from both vertical and. horizontal displacement with respect to the shank 58. Therefore, once the clamp 306 is installed on the shank 58, the mounting plate 300/mold section 54a assembly moves integrally with the shank 58. The clamp 306 is secured to the shank 58 by fasteners. Typically, the fasteners may be bolts 310, which enable rapid installation and removal of the mounting plate 300/mold section 54a assembly to the shank 58.

Accordingly, mold section installation and/or removal is rapidly performed. The mounting plate 300/mold section 54a assembly is slid into the shank 58 by the keyway 302 of the mounting plate 300 engaging a corresponding slot in the shank. The positive stop 304 will set the mounting plate 300/mold section 54a horizontally, and the clamp 306 is secured to the shank 58 so as to immobilize the mounting plate 300/mold section 54a assembly to the shank 58. To remove the mounting plate 300/mold section 54a assembly from the shank 58, the clamp 306 is first removed such that the mounting plate 300/mold section 54a assembly may be slid outwardly off the shank 58. Although the above-described rapid changeover system has been described for the mold section 54a, it is obvious that all mold sections 54 of the present invention may be secured to their respective shanks 58 in the same manner.

Still referring to FIGS. 13 and 14, the die-casting system of the present invention may also provide the mold sections with an ejection mechanism in order to eject the molded product from the mold cavity. The ejection mechanism is generally shown at 320 and has an ejector hub 322 received in a cavity 324 of the shank 58. The ejector hub 322 generally moves with the shank 58, but is enabled to slide in the cavity 324. The ejector hub 322 has a front head 326 and a rear head 328 by which it is supported in the cavity 324, i.e., peripheral surfaces of the front head 326 and the rear head 328 are slidingly received on a surface defining the cavity 324. Stop pins 330 have free ends thereof received in lateral slots 332 of the shank 58, and are displaceably engaged in the guide members 62. For instance, they are slid into the guide members 62 and are fixed by set screws (not shown). Therefore, the stop pins may be removed from the guide members 62, or may be further inserted into the cavity 324 of the shank 58. The stop pins 330 limit the stroke of the ejector hub 322 in the cavity 324 of the shank 58. Therefore, when the shank 58 moves towards the molding position, i.e., from right to left in FIG. 13, the ejector hub 322 will move with the shank 58 until the rear head 328 abuts the stop pins 330. When the stop pins 330 abut the rear head 328 of the ejector hub 322, the latter will be immobilized with respect to the stop pins 330, while the shank 58 will keep on moving toward the molding position, the ejector hub sliding in the cavity 324. Similarly, when the shank 58 moves away from the molding position, i.e., from left to right in FIG. 13, the stop pins 330 will eventually abut the front head 326 such that the ejector hub 322 is immobilized with respect to the stop pins 330, while the shank 58 keeps on moving away from the molding position.

Ejector pins 334 are slidingly engaged in the mold section 54b, and are interconnected by an ejector plate 336, which is slidingly received in the mounting plate.300. When the mold section 54b/mounting plate 300 assembly is mounted to the shank 58, the ejector plate 336 is secured to the ejector hub 322. More precisely, as the mold section 54b/mounting plate 300 assembly is in a quick-coupling relation with the shank 58, the ejector plate may be appropriately provided with a female T-slot 338, adapted for engagement with a corresponding T-head 340 disposed on the front head 326 of the ejector hub 322. Therefore, when the mold section 54b/mounting plate 300 assembly is slid onto the shank 58, the ejector hub 322 is connected to the ejector plate 336 by the coupling of the T-head 340 with the female T-slot 338 of the ejector plate 336. Thereafter, the above-described clamp 306 is used in order to secure the mounting plate 300 to the shank 58. Therefore, when the mounting plate 300 is mounted to the shank 58, the ejector pins 334 move with the ejector hub 322, as they are connected thereto. When the shank 58 moves toward the molding position, i.e., from right to left in FIGS. 13 and 14, the rear head 328 of the ejector hub 322 will eventually abut the stop pins 330, as described above, such that the ejector hub 322 will be immobilized. Therefore, this will immobilize the ejector pins 334 while the mold section 54b keeps on moving, whereby the ejector pins 334 will retract out of the mold cavity of the mold section 54b. Once a product has been molded, the mold sections 54 are separated for the ejection of the molded product. The ejector hub 322 will move with the shank 58 until the front head 326 thereof abuts against the stop pins 330. This will immobilize the ejector pins 334, as described above, whereby they will emerge out of the mold section 54b to push against the molded product, thereby ejecting it therefrom.

The shanks 58 are typically adapted for receiving a given size of mold sections 54. The mounting plates 300 are configured to permit the mounting of mold sections 54 of smaller dimensions than the nominal specifications of the shank 58. Smaller mold sections 54 used to require a change of shank 58 to be mounted to the die-casting machine 20. However, the mold mounting plate 300 enables the mold sections 54 of smaller and larger sizes to be mounted to a given shank 58. This enables keeping a same shank 58 on the die-casting machine 20, and thus saves substantial time in effecting a mold section changeover. For instance, in order to mount a smaller mold section 54 on the shank 58, the L-shaped configuration of the mounting plate, as well seen in FIGS. 15 to 17, ensures a stable connection with the mold section 54.

The centerline of the molds of the mold sections 54 must be kept in line with the centerline of the clamping mechanism (i.e., the shanks 58) to preserve a proper force distribution on mating faces of the molds. This is necessary for generating a proper sealing of the mold sections 54 when clamped one to another to provide a symmetrical distribution of the clamping force to minimize the wear of the clamping mechanism.

When mounting smaller mold sections 54 on the mounting plate 300 while aligning the respective centerlines of the two parts on a coincident line, the gap that is present between the mold section 54 and the base plate of the guideway is filled by the "L" extension of the mounting plate 300, as well illustrated in FIG. 14.

Figure 17:
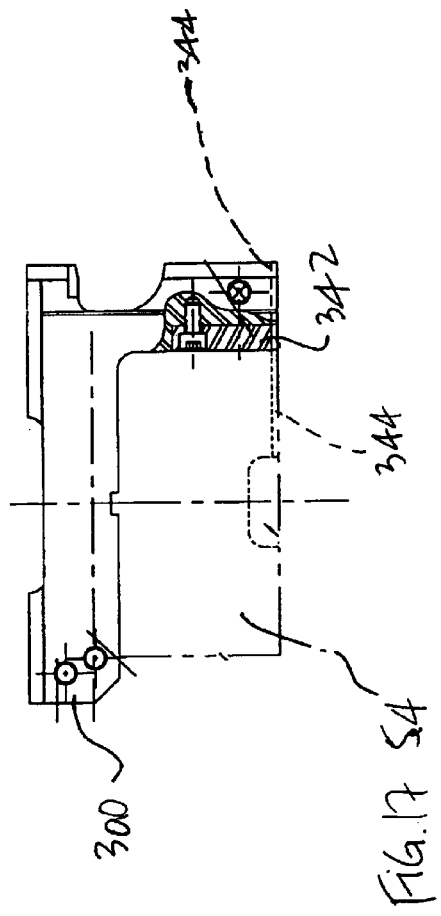
FIG. 17 is a top plan view, partly sectioned, of the mold section mounted to the mounting plate.
Figure 15:
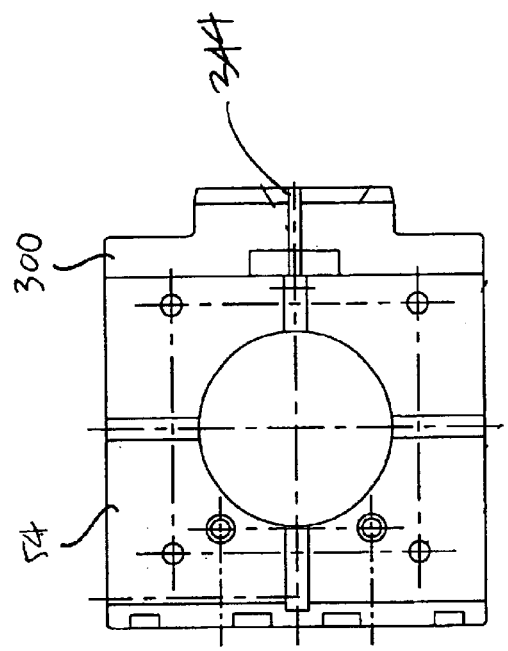
FIG. 15 is a front elevational view of a mounting plate in accordance with the present invention.
Figure 16:
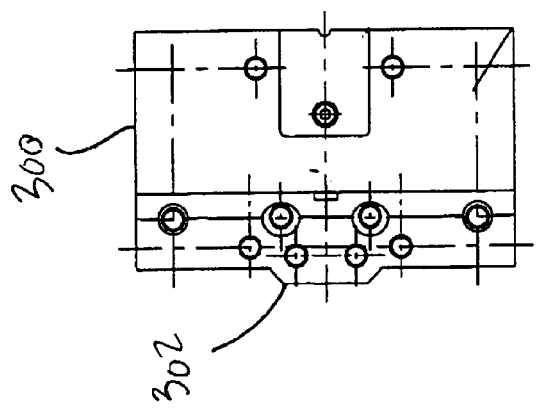
FIG. 16 is a side elevational view of the mounting plate.

Referring to FIGS. 15 to 17, the mold sections 54 may vary in size while being mountable to a same shank 58. Adaptor inserts 342 are required to adapt the mold sections to the mounting plate 300. The mounting plates 300 have to be precisely fitted to the mold sections 54 by means of the adaptor inserts 342, which adjust the horizontal positioning of the mold sections 54, in order to provide a proper sealing. An injection channel 344 is machined in the "L" extension of the mounting plates 300 and in the adaptor inserts 342 to provide a path for the injected molten metal.

It is to be understood that the invention is not limited to the illustrations described and shown herein, which are deemed to be merely illustrative of the best modes of carrying out the invention, and which are susceptible to modification as to form, size, arrangement of parts and details of configuration. The invention rather is intended to encompass all such modifications which are within its spirit and scope as defined by the claims.

We claim:

1. A method for installing mold section assemblies on a shank of a die-casting machine, comprising the steps of:
   i) providing a first mold section, a second mold section, and a pair of mounting plates;
   ii) securing the first mold section to one of the mounting plates to form a first mold section assembly;

iii) connecting said one of the mounting plate to the shank to install the first mold section assembly to the shank for subsequently molding parts with the first mold section assembly;

iv) securing the second mold section to an other of the mounting plates to form a second mold section assembly;

v) removing the first mold section assembly from the shank; and vi) connecting said other of the mounting plate to the shank to install the second mold section assembly to the shank for subsequently molding parts with the second mold section assembly.

2. The method according to claim 1, wherein the step iii) includes sliding the first mold section assembly into engagement onto the shank in a direction generally perpendicular to a direction of translation of the shank on the die-casting machine, and securing the first mold section assembly to the shank with securing means.

3. The method according to claim 2, wherein the step v) includes removing the securing means securing the first mold section assembly to the shank, and sliding the first mold section assembly away from the shank in a direction opposite the direction of sliding engagement between the first mold section assembly and the shank, whereby the first mold section assembly is removed from the shank.

4. The method according to claim 2, wherein the step vi) includes sliding the second mold section assembly into engagement onto the shank in a direction generally perpendicular to a direction of translation of the shank on the die-casting machine, and securing the second mold section assembly to the shank with securing means.

5. The method according to claim 2, wherein the step iii) includes engaging an ejector portion of the first mold section assembly with an actuator portion of the shank simultaneously with a sliding engagement of the first mold section assembly with the shank.

6. The method according to claim 1, wherein the step ii) includes interconnecting an adaptor between the first mold section and the mounting plate to form the first mold section assembly.

7. The method according to claim 1, wherein the step iv) includes interconnecting an adaptor between the second mold section and the mounting plate to form the second mold section assembly.

* * * * *